J. G. KENMIR, Jr.
CARBURETER.
APPLICATION FILED OCT. 30, 1913.
1,165,676.
Patented Dec. 28, 1915.
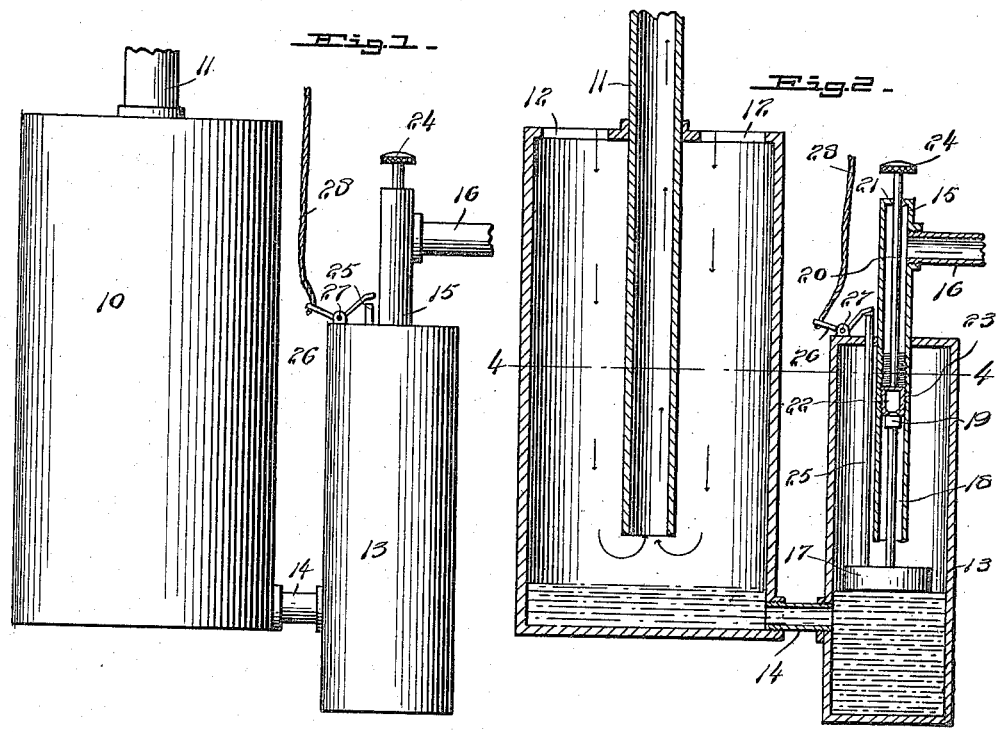
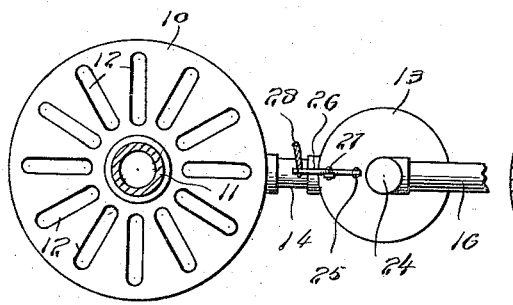
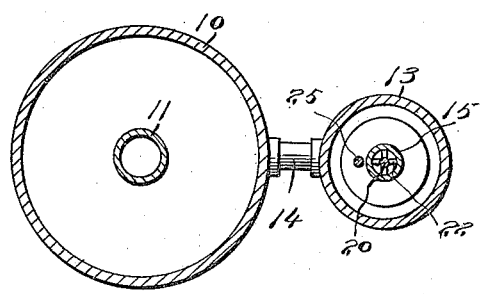
Witnesses
Inventor
J. G. Kenmir Jr.
By 
Attorneys
COLUMBIA PLANOGRAPH CO., WASHINGTON, D. C.

UNITED STATES PATENT OFFICE.

JOHN GEORGE KENMIR, JR., OF EMERADO, NORTH DAKOTA.

CARBURETER.

1,165,676.

Specification of Letters Patent.     Patented Dec. 28, 1915.

Application filed October 30, 1913. Serial No. 798,359.

*To all whom it may concern:*

Be it known that I, JOHN G. KENMIR, Jr., a citizen of the United States, residing at Emerado, in the county of Grand Forks, State of North Dakota, have invented certain new and useful Improvements in Carbureters; and I do hereby declare the following to be a full, clear, and exact description of the invention, such as will enable others skilled in the art to which it appertains to make and use the same.

This invention relates to carbureters and has for an object to provide a carbureter that will have only one adjustment, this being the float valve adjustment, whereby the construction of the carbureter is greatly simplified.

A further object of the invention is to provide a carbureter in which the fuel will stand at a predetermined level in the carbureting chamber, and the air will be drawn over the surface of this accumulated fuel and charged with the evaporating fuel whereby the proper mixture will be made before the charge is drawn from the carbureter into the engine.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—Figure 1 is a side elevation of a carbureter embodying my improvements. Fig. 2 is a longitudinal sectional view through the parts shown in Fig. 1. Fig. 3 is a plan view. Fig. 4 is a cross sectional view on the line 4—4 Fig. 2.

Referring now to the drawing in which like characters of reference designate similar parts, 10 designates a cylindrical carbureting chamber through the top of which the intake pipe 11 to the engine projects, said pipe extending nearly to the bottom of the chamber. Formed in the top of the chamber is a radial circular series of slots 12 through which the air is drawn by the suction of the engine and passes down to nearly the bottom of the chamber as shown by the arrows and thence is drawn up through the pipe 11 to the engine.

A cylindrical float chamber 13 is arranged to one side of the carbureting chamber 10 and projects slightly below the latter, there being a short connecting pipe 14 opening into both the carbureting chamber and float chamber at the level of the bottom of the mixing chamber. A straight upstanding pipe 15 opens through the top of the float chamber and has a lateral branch 16 adapted to be connected to a fuel supply. A float 17 is disposed within the float chamber and carries a central upstanding stem 18 that terminates at the top in a valve 19, the stem projecting up in the pipe 15. A rod 20 is turnably mounted in a closure 21 at the top of the pipe 15 and carries at the lower end a valve seat 22 that has a screw thread connection 23 with the inner face of the pipe 15. The rod is equipped at the top with a button 24 whereby the rod may be rotated to advance or retract the valve seat in the pipe 15 and thus adjust the float valve to permit of any desired quantity of fuel accumulating in the bottom of the float chamber. The float in normal position lies above the pipe 14 so that the fuel will stand at a predetermined level in both the float chamber and carbureting chamber, such level being determined by the adjustment of the valve seat.

For priming the carbureter to flood the carbureting chamber up to the bottom of the intake pipe 11, a rod 25 is mounted for vertical movement in an opening in the top of the float chamber and rests upon the top face of the float. An angular lever 26 is pivoted at its elbow 27 on the top of the float chamber and has one leg overhanging the rod and has the opposite leg equipped with a pull cord 28 by means of which the lever may be rocked to depress the rod and hold the float down until the carbureting chamber is flooded to the desired extent.

In operation, when the engine is cranked air will be drawn into the carbureting chamber through the air openings 12 and will pass through the carbureting chamber as shown by the arrow heads with a resultant mixing during such passage with the fuel, the mixture being then drawn through the pipe 11 into the engine.

From the above description it will be seen that I have provided an extremely simple carbureter in which there is but one adjustment to be made, and in which by virtue of the fuel standing at a predetermined level in both the carbureting chamber and float chamber, all foreign matter will gravitate to the bottoms of these chambers and will not pass into the engine.

What is claimed, is:—

In combination with a receptacle, means for supplying liquid to said receptacle, said means comprising a casing communicating at its lower end with said receptacle, an inlet pipe extending into said casing, a stem turnable in said pipe, a valve seat secured upon the lower end of said stem and having screw threaded engagement with the inner wall of said pipe, a float within said casing, a stem on said float extending into said pipe, a valve secured on the upper end of said stem and adapted to seat within said valve seat, said float controlling the level of the liquid within said casing, and means for depressing said float whereby the level of the liquid within said casing may be raised, said means comprising a rod slidable within said casing, resting on said float, and a lever for moving said last named rod downwardly.

In testimony whereof, I affix my signature, in the presence of two witnesses.

JOHN GEORGE KENMIR, JR.

Witnesses:
JOSEPH McGRATH,
MYRAN DEZELL.

Copies of this patent may be obtained for five cents each, by addressing the "Commissioner of Patents, Washington, D. C."